United States Patent
Brannon

(10) Patent No.: US 10,187,374 B2
(45) Date of Patent: *Jan. 22, 2019

(54) MULTI-FACTOR AUTHENTICATION FOR MANAGED APPLICATIONS USING SINGLE SIGN-ON TECHNOLOGY

(71) Applicant: AirWatch LLC, Atlanta, GA (US)

(72) Inventor: Jonathan Blake Brannon, Smyrna, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,769

(22) Filed: Oct. 29, 2015

(65) Prior Publication Data

US 2017/0126661 A1    May 4, 2017

(51) Int. Cl.
*G06F 7/04* (2006.01)
*H04L 29/06* (2006.01)

(52) U.S. Cl.
CPC ...... *H04L 63/0815* (2013.01); *H04L 63/0823* (2013.01); *H04L 63/12* (2013.01); *H04L 63/0807* (2013.01); *H04L 2463/082* (2013.01)

(58) Field of Classification Search
CPC .......... G06F 21/31; G06F 21/32; G06F 21/33; G06F 21/41; H04L 2463/082; H04L 29/06802; H04L 29/06768

(Continued)

(56) References Cited

U.S. PATENT DOCUMENTS 5,781,909 A    7/1998  Logan et al.
8,544,069 B1 *  9/2013  Subbiah .................. G06F 21/41
                                                        340/5.8

(Continued)

FOREIGN PATENT DOCUMENTS

WO    2010083889    7/2010
WO    2014151227    9/2014

OTHER PUBLICATIONS

Heckle et al, Network Authentication Using Single Sign-on the Challenge of Aligning Mental Models, 2008, ACM, pp. 1-10.*

(Continued)

*Primary Examiner* — Luu T Pham
*Assistant Examiner* — Jenise E Jackson
(74) *Attorney, Agent, or Firm* — Clayton, McKay & Bailey, PC

(57) ABSTRACT

Disclosed are various examples for facilitating multi-factor authentication for client applications that are configured to use single sign-on technology. An authentication request for a first client application executed in a client device is received by an identity provider. The identity provider then receives data generated by a single sign-on credential from the client device. The single sign-on credential is configured to be used by multiple client applications of the client device. The data generated by the single sign-on credential is verified by the identity provider. The identity provider requests one or more supplementary authentication factors from a second client application. The identity provider then receives the supplementary authentication factor(s) from the second client application and verifies the supplementary authentication factor(s). The identity provider generates an authentication token and sends the token to the first client application.

20 Claims, 8 Drawing Sheets

(58) Field of Classification Search
USPC .......................................................... 726/7
See application file for complete search history.

(56) References Cited

U.S. PATENT DOCUMENTS

| | | | |
|---|---|---|---|
| 8,850,546 B1 | 9/2014 | Field et al. | |
| 8,984,149 B1 | 3/2015 | Martini | |
| 9,087,189 B1 | 7/2015 | Koeten | |
| 9,866,546 B2 | 1/2018 | Brannon | |
| 2002/0078153 A1 | 6/2002 | Chung et al. | |
| 2002/0133725 A1 | 9/2002 | Roy et al. | |
| 2006/0206707 A1 | 9/2006 | Kostal et al. | |
| 2007/0028095 A1 | 2/2007 | Allen et al. | |
| 2007/0157298 A1* | 7/2007 | Dingwall | G06F 21/34 726/8 |
| 2008/0115198 A1* | 5/2008 | Hsu | G06F 21/31 726/5 |
| 2008/0134049 A1 | 6/2008 | Gupta | |
| 2008/0250419 A1 | 10/2008 | Kasten | |
| 2008/0263653 A1 | 10/2008 | Lee et al. | |
| 2008/0301791 A1* | 12/2008 | Smith | G06F 21/41 726/7 |
| 2010/0082491 A1 | 4/2010 | Rosenblatt et al. | |
| 2010/0235918 A1 | 9/2010 | Mizrahi et al. | |
| 2010/0318636 A1 | 12/2010 | Matsumura | |
| 2012/0079569 A1 | 3/2012 | Mendelovich | |
| 2012/0210413 A1 | 8/2012 | Akula | |
| 2012/0245990 A1 | 9/2012 | Agarwal | |
| 2012/0272307 A1* | 10/2012 | Buer | H04L 63/0853 726/9 |
| 2012/0290336 A1 | 11/2012 | Rosenblatt et al. | |
| 2012/0291114 A1 | 11/2012 | Poliashenko | |
| 2013/0049928 A1 | 2/2013 | Moore et al. | |
| 2013/0086669 A1 | 4/2013 | Sondhi et al. | |
| 2013/0117831 A1 | 5/2013 | Hook et al. | |
| 2013/0124756 A1 | 5/2013 | Voronel et al. | |
| 2013/0276080 A1 | 10/2013 | Nakonetzki et al. | |
| 2013/0290226 A1 | 10/2013 | Dokken | |
| 2013/0312061 A1* | 11/2013 | Casals Andreu | G06F 21/40 726/3 |
| 2014/0007198 A1 | 1/2014 | Durbha et al. | |
| 2014/0020078 A1* | 1/2014 | Canning | H04L 63/0815 726/8 |
| 2014/0052548 A1 | 2/2014 | Dokken, Jr. | |
| 2014/0082715 A1 | 3/2014 | Grajek et al. | |
| 2014/0156732 A1 | 6/2014 | Lanni | |
| 2014/0189841 A1* | 7/2014 | Metke | G06F 21/40 726/9 |
| 2014/0237236 A1* | 8/2014 | Kalinichenko | G06F 21/43 713/168 |
| 2014/0245411 A1 | 8/2014 | Meng | |
| 2014/0279622 A1 | 9/2014 | Lamoureux | |
| 2014/0298348 A1* | 10/2014 | Qureshi | H04L 41/0816 718/104 |
| 2014/0310792 A1 | 10/2014 | Hyland et al. | |
| 2014/0376403 A1 | 12/2014 | Shao | |
| 2015/0046997 A1 | 2/2015 | Gupta et al. | |
| 2015/0052584 A1 | 2/2015 | Rudraraju | |
| 2015/0074785 A1 | 3/2015 | Driscoll | |
| 2015/0180857 A1 | 6/2015 | Schulman | |
| 2015/0188999 A1 | 7/2015 | Manuel-Devadoss | |
| 2015/0215348 A1* | 7/2015 | Koeten | H04L 65/1073 709/225 |
| 2015/0244706 A1* | 8/2015 | Grajek | H04L 63/0815 726/6 |
| 2015/0317466 A1 | 11/2015 | Kumar et al. | |
| 2015/0365405 A1* | 12/2015 | Kalinichenko | G06F 21/43 726/3 |
| 2016/0077901 A1 | 3/2016 | Roth | |
| 2016/0080355 A1 | 3/2016 | Greenspan | |
| 2016/0162910 A1 | 6/2016 | Pradhan | |
| 2016/0164855 A1 | 6/2016 | Johansson | |
| 2016/0164860 A1* | 6/2016 | Dunne | H04L 63/0815 726/8 |
| 2016/0219060 A1 | 7/2016 | Karunakaran et al. | |
| 2016/0241599 A1 | 8/2016 | Qureshi | |
| 2016/0269898 A1 | 9/2016 | Kueh | |
| 2016/0285847 A1 | 9/2016 | Oberheide | |
| 2016/0285871 A1* | 9/2016 | Chathoth | H04L 63/0807 |
| 2016/0337344 A1* | 11/2016 | Johansson | H04L 63/0838 |
| 2017/0032111 A1* | 2/2017 | Johansson | G06F 21/31 |
| 2017/0046758 A1* | 2/2017 | Sheehan | G06Q 20/10 |
| 2017/0111351 A1* | 4/2017 | Grajek | H04L 63/0815 |
| 2017/0359180 A1* | 12/2017 | Choi | H04L 9/3263 |

OTHER PUBLICATIONS

Doyle et al, Ubiquitos Desktops with Mult-factor Authentication, 2008, IEEE, pp. 198-203.*
Office Action dated May 30, 2017 for U.S. Appl. No. 14/739,980.
Office Action dated Jan. 27, 2017 for U.S. Appl. No. 14/926,763.
Office Action dated Mar. 15, 2017 for U.S. Appl. No. 14/739,975.
Office Action dated Nov. 14, 2016 for U.S. Appl. No. 14/739,980.
Office Action dated Nov. 21, 2016 for U.S. Appl. No. 14/739,975.
International Search Report dated Oct. 7, 2016 for PCT/US2016/037369.
Notice of Allowance for U.S. Appl. No. 14/926,736 dated Sep. 6, 2017.
International Search Report dated Oct. 6, 2016 for Application No. PCT/US2016/037353.
Doyle et al, Ubiquitous Desktops with Multi-factor Authentication, 2008, IEEE, pp. 198-203.
Benkhelifa et al, On a Real World Implementation of Advanced Authentication Mechanism in a Multi-Tenant Cloud Service Delivery Platform, 2014, IEEE, pp. 1-6.
Office Action dated May 18, 2018 for U.S. Appl. No. 15/865,254.

* cited by examiner

MULTI-FACTOR AUTHENTICATION FOR MANAGED APPLICATIONS USING SINGLE SIGN-ON TECHNOLOGY

CROSS-REFERENCE TO RELATED APPLICATIONS

This application is related to U.S. Patent Application entitled "SELECTIVELY ENABLING MULTI-FACTOR AUTHENTICATION FOR MANAGED DEVICES" and filed on even date herewith under Ser. No. 14/926,763, which is incorporated herein by reference in its entirety.

BACKGROUND

Multi-factor authentication systems are becoming increasingly popular for computing system account security. Traditionally, users have provided a username and a password to log into a user account. However, malicious users can also gain access to the user account simply by having knowledge of the username and the password. In other words, username and password systems rely only on two items of information that the user knows. Thus, such systems rely exclusively on knowledge-based authentication factors.

Other authentication factors can include what the user has (possession factors) and who the user is (inherence factors). Examples of possession factors can include possession of a trusted device (e.g., smartwatch, smartphone, or other device with a long-lived credential stored thereon or able to communicate by way of a trusted telephone number or email address), possession of a key-fob token that generates one-time passwords, and possession of a smartcard. Examples of inherence factors can include retinal scans, iris scans, and fingerprint scans. Adding possession and/or inherence factors to an authentication system that uses username and password-based authentication can greatly improve security. Also, requiring answers to other knowledge-based questions can improve security. The questions can be dynamically generated based on transaction histories (e.g., "which of following is the correct purchase amount of your transaction yesterday?"), or credit histories, or may be based on static answers to questions that are preconfigured by the user (e.g., "who was your favorite school teacher?").

Unfortunately, it can be difficult to practically implement multi-factor authentication in native applications. Application developers would have to write custom authentication code and/or include code from a software development kit that enables multi-factor authentication, but it can be very challenging to convince developers to do this. As a consequence, an organization that manages devices, such as under a bring-your-own-device model, cannot require multi-factor authentication for native applications under existing approaches.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enabling multi-factor authentication for applications on managed devices. Convincing developers of applications to include code that supports multi-factor authentication is for many reasons impractical. However, as will be described, single sign-on systems that are already supported on managed devices can be extended to support multi-factor authentication. Managed applications can support a single sign-on experience through the use of an identity provider. With a single sign-on experience, a user enters a single set of security credentials for an account and, upon authentication, the user is able to access multiple different applications and services that are linked to that account. In some operating systems, such as IOS, the operating system itself can include support for single sign-on. As will be described, the identity provider that supports existing single sign-on approaches for managed devices can be modified to include a multi-factor authentication adapter. This adapter, when enabled, can require the user to provide one or more authentication factors using the same device or another trusted device before permitting authentication.

Furthermore, in various embodiments, administrators of an organization that manages devices can selectively enable multi-factor authentication for specific applications. This configuration can be static or dynamic. If dynamic, whether multi-factor authentication is enabled for a given application can change based upon a variety of factors such as device status, device location, network status, and other factors.

Figure 1:
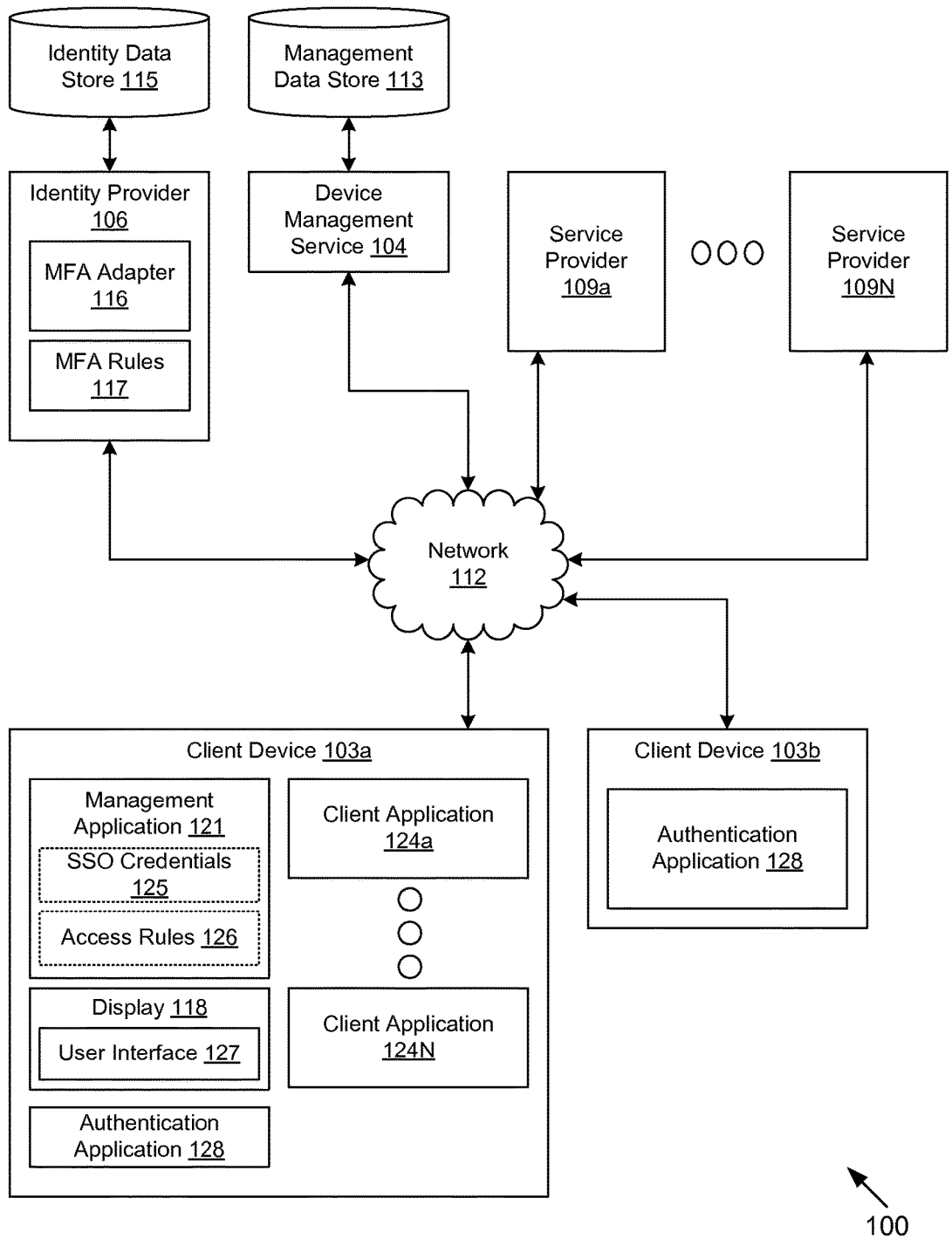
FIG. 1 is a drawing of a networked environment according to various examples of the disclosure.

With reference to FIG. 1, shown is a networked environment 100 according to various examples. The networked environment 100 can include a plurality of client devices 103a and 103b, a device management service 104, an identity provider 106, and a plurality of service providers 109a . . . 109N, which can be in data communication with one another over the network 112. The network 112 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The device management service 104, the identity provider 106, and the service providers 109 can include, for example, a server computer or any other system providing computing capabilities. Alternatively, the device management service 104, the identity provider 106, and the service providers 109 can employ multiple computing devices that can be arranged, for example, in one or more server banks, computer banks, or other arrangements. The computing devices can be located in a single installation or can be distributed among many different geographical locations. For example, the device management service 104, the identity provider 106, and the service providers 109 can include multiple computing devices that together form a hosted computing resource, a grid computing resource, or any other distributed computing arrangement. In some cases, the device management service 104, the identity provider 106, and the service providers 109 can operate as at least a portion of an elastic computing resource where the allotted capacity of processing, network, storage, or other computing-related resources can vary over time. The device management service 104, the identity provider 106 and the service providers 109 can also include or be operated as one or more virtualized computer instances. Generally, the device management service 104, the identity provider 106 and the service providers 109 can be operated in accordance with particular security protocols such that they are considered trusted computing environments.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104.

To facilitate management of client devices 103, the device management service 104 can establish a secure communications channel with the client devices 103 (e.g., a mobile device management channel, or MDM channel). The device management service 104 can establish the secure communications channel by creating a secure communication link with the client device 103. A secure communication link can be established using MDM application programming interfaces (APIs) that are provided by an operating system executed by the client device 103. In some examples, the secure communications channel can be established using a push notifications framework or notification service provided by an operating system ecosystem associated with the client device 103 that allows for communications between the device management service 104 and a client device 103 over the network 112 that are encrypted using a digital certificate.

The client device 103a can be enrolled as a managed device with the device management service 104 through APIs provided by the operating system. The enrollment process can include authentication of a user's credentials. Upon authentication of a user's credentials by the device management service 104, the client device 103a, using the MDM APIs of the operating system, can enroll the client device 103a as a managed device so that various management functions can be securely performed over the secure communications channel.

Examples of management functions can include commands to erase certain data from the client device 103a, commands to install certain applications or application updates, commands to lock a client device 103a or activate a display lock feature, a command to remotely perform a factory reset of the client device 103a, or other management functions. Additionally, data can be securely transmitted through the secure communications channel to the client device 103a or applications executed by the client device 103a.

Additionally, the operating system of the client device 103a can also provide the ability to create access-restricted storage that is associated with particular applications installed on the client device 103a. Access-restricted storage can be associated with multiple applications that are installed on the client device 103a through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103a over the secure communications channel that can be stored in the access-restricted storage such that it is accessible by certain applications and inaccessible to other applications that are installed on the client device 103a.

The secure communications channel can be encrypted or secured using a digital certificate that is associated with the client device 103a, the device management service 104, or an enterprise with which the client device 103a is associated. In one scenario, the device management service 104 can obtain a security certificate, such as a secure sockets layer (SSL) certificate, that is unique to a particular enterprise with which a client device 103a is associated. In one example, an administrator associated with the enterprise can provide a certificate to the device management service 104 using an administrator console or other functionality with which a certificate can be uploaded. The certificate can also be signed by a certificate authority, which can in some cases be operated by the device management service 104. The device management service 104 can encrypt or secure the secure communications channel using the certificate so that the secure communications channel is a secure communication link over the network 112 through which data can be sent to the client device 103.

Additionally, the device management service 104 can specify that data sent through the secure communications channel can only be accessed by certain applications installed on the client device 103a. The applications that can access data sent through the secure communications channel can also be restricted in how certain data can be manipulated, viewed or handled on the client device 103a. For example, an application installed on the client device 103a can be coded to restrict the ability of a user to capture, share, or otherwise remove data from the client device 103a that is received through the secure communications channel.

The device management service 104 can also facilitate ensuring that client devices 103aa that are administered by the device management service 104 are operating in compliance with various compliance rules. In one scenario, the device management service 104 can issue management commands that instruct a client device 103 to take a particular action with respect to a compliance rule. For example, if a client device 103a is designated as lost or stolen, the device management service 104 can issue a command instructing the client device 103a to erase data and applications that were previously sent to the client device 103a through the secure communications channel or other communication links and otherwise stored on the client device 103a. The device management service 104 can also obtain data from a third party computing environment, such as an application, a security code, authentication token, or other data. As another example, if the device management service 104 determines that a client device 103a has violated a compliance rule with respect to having unauthorized modifications or unauthorized applications installed on the client device 103a, the device management service 104 can issue a command instructing the client device 103a to erase data and applications stored on the client device 103a. As a further example, the device management service 104 can also issue a command instructing the client device 103a to activate a display lock of the client device 103a that requires a user to enter a personal identification number (PIN) in order to use the client device 103a.

The data stored in the management data store 113 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103a that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if client device 103a falls out of compliance with one or more compliance rules, a management command can be transmitted to the client device 103a instructing the client device 103a to perform one or more actions specified by the compliance rule. Alternatively, a compliance rule can also reside on the client device 103a, which can self-enforce compliance rules. The management data store 113 can also include user account data. User account data can include information with which a user account can be authenticated, such as user credentials. User account data can also include data such as email, contact, calendar data, documents, files or other data that is associated with a user account.

Device data can represent data stored in the management data store 113 that is associated with client devices 103a that are enrolled with the device management service 104 as managed devices. Device data can include a unique device identifier associated with the client device 103a, device policies that are associated with a particular client device 103a, status information associated with a particular client device 103a, and other data that facilitates management of the client device 103a by the device management service 104. Device data can also include user data that is synchronized with a particular client device 103a. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The identity provider 106 can provide a federated identity service on behalf of the service providers 109. To this end, the identity provider 106 can be in communication with an identity data store 115 that stores information associated with user identities. This information can include, for example, usernames, security credentials, biometric identity information, authorized client applications, unauthorized client applications, authorized client devices 103, unauthorized client devices 103, and so on. As will be described, users are able to authenticate by way of the identity provider 106 in order to access services provided by the multiple service providers 109. The identity provider 106 can include a plurality of platform adapters to facilitate platform-specific authentication on different client platforms, such as IOS, ANDROID, WINDOWS, and so on.

In various embodiments, the identity provider 106 can include a multi-factor authentication (MFA) adapter 116 that enables multi-factor authentication for client devices 103 and service providers 109. Multiple MFA adapters 116 that are platform specific can be provided in some cases. The MFA adapter 116 can function alongside non-multi-factor authentication by the identity provider 106. In particular, the operation of the MFA adapter 116 can be controlled by a set of MFA rules 117 that can enable or disable the MFA adapter 116 in various scenarios.

The service providers 109 provide corresponding services for client applications. The services can include, for example, social networking services, email services, voice communication services, enterprise information management services, productivity services, game services, and so on. In some examples, one or more of the service providers 109 can authenticate users separately from the identity provider 106, thereby giving users the option to log in either with the identity provider 106 or with the service provider 109 directly. It is noted that the service providers 109 need not be aware of the MFA adapter 116. As long as the service providers 109 are configured to use the identity provider 106 for authentication, the identity provider 106 can enable or disable multi-factor authentication using the MFA adapter 116 without involvement of the service providers 109.

The service providers 109 and the identity provider 106 can communicate with the client device 103 over the network 112 by way of hypertext transfer protocol (HTTP), simple object access protocol (SOAP), representational state transfer (REST), and/or other protocols.

Each client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client devices 103 can include a display 118 that includes, for example, one or more devices such as liquid crystal display (LCD) displays or other types of display devices. The client devices 103 can also be equipped with networking capability or networking interfaces, including a localized networking or communication capability such as an NFC capability, RFID read and/or write capability, a microphone and/or speaker, or other localized communication capability.

The client device 103a can execute various applications, such as a management application 121, a plurality of client applications 124a . . . 124N, and other applications, services, or processes. The management application 121 can receive security credentials from a user and to authenticate with the device management service 104. Upon authentication with the device management service 104, the management application 121 is able to obtain single sign-on (SSO) credentials 125, which in turn allow the client applications 124 to request identity assertions from the identity provider 106 in order to authenticate the client applications 124 with the respective service providers 109 as will be described. Although described as an application, it is understood that the management application 121 can be an integral component of an operating system of the client device 103. Also, in some scenarios, the SSO credentials 125 can be provisioned directly to the operating system for all client applications 124 to use. This can be performed under IOS using either a certificate profile that is installed in a managed certificate keychain or a combination of a certificate and a Kerberos profile together. Rather than being stored in the management application 121, the SSO credentials 125 can be stored in the operating system itself in these scenarios. Access rules 126 can restrict which client applications 124 are permitted to use the SSO credentials 125 for authenticating with identity providers 106. In various implementations, the access rules 126 can be maintained and enforced by the identity provider 106.

An identity assertion in security assertion markup language (SAML), for example, contains a packet of security information that service providers 109 use to make access control decisions. SAML supports three types of statements: authentication statements, attribute statements, and authorization decision statements. Authentication statements assert to the service provider 109 that the client device 103 authenticated with the identity provider 106 at a particular time using a particular method of authentication. An attribute statement asserts that a client device 103 is associated with certain attributes. An authorization decision statement asserts that a client application 124 is permitted to perform a certain action relative to a resource offered by the service provider 109. Extensible access control markup language (XACML) and/or other languages can be employed.

The client applications 124 correspond to a variety of applications that are employed to access services provided by the service providers 109. The client applications 124 can include a web view component, whereby the client applications 124 interact with the service providers 109 to obtain network content by way of hypertext transfer protocol (HTTP) requests and responses. However, unlike a browser that is used to access various web-based applications, cookies set through one client application 124 cannot be accessed by another client application 124. The client applications 124 and the management application 121 can individually render a respective user interface 127 upon the display 118.

The client devices 103a and 103b can also include an authentication application 128, which is a special-purpose client application 124 used to complete multi-factor authentication, when multi-factor authentication is requested by the MFA adapter 116. The authentication application 128 can be executed on the same client device 103a as the client application 124 that is being authenticated. Alternatively, the authentication application 128 can be executed on a different client device 103b. In some cases, the functions of the authentication application 128 can be performed by the management application 121.

Figure 2:
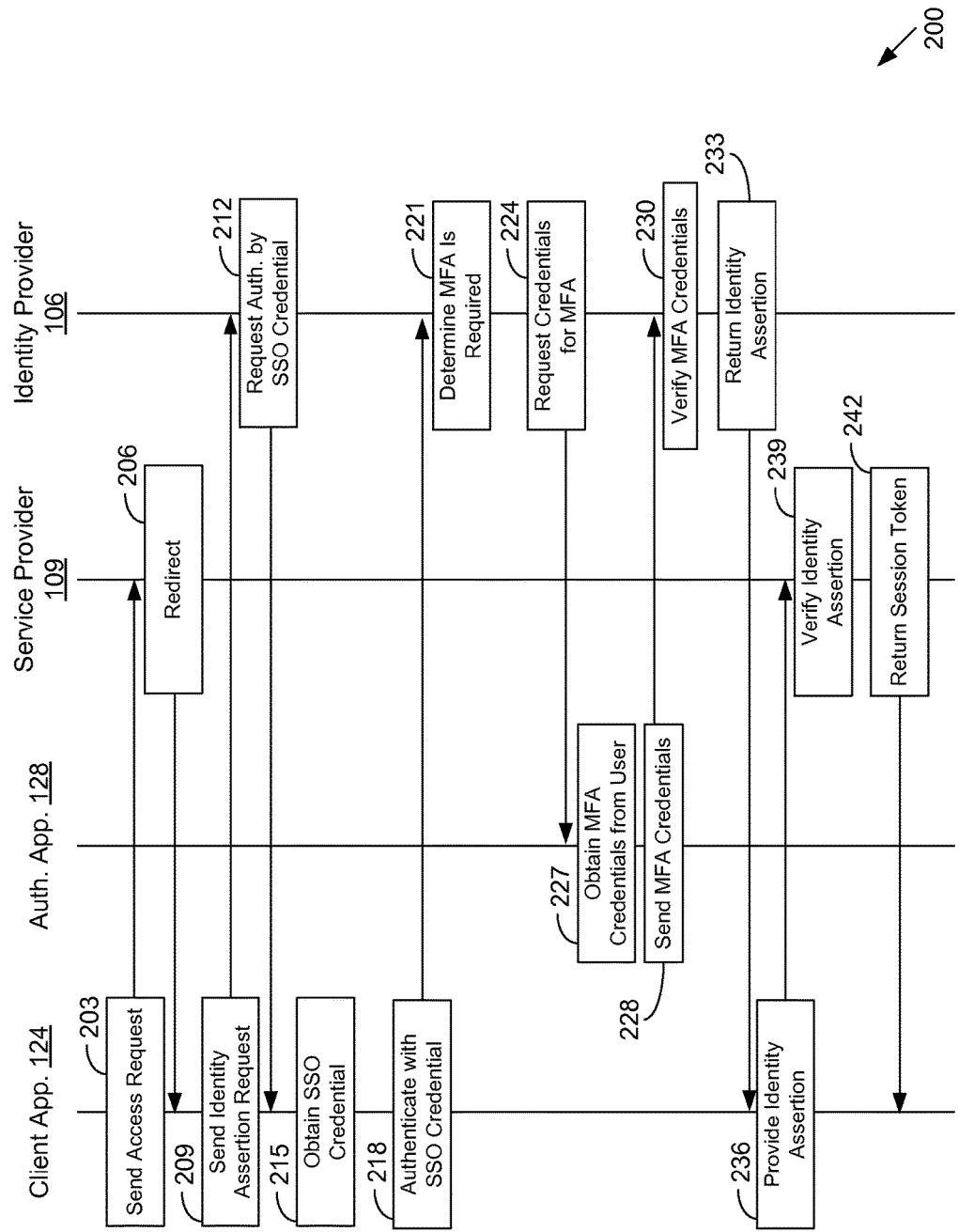
FIG. 2 is a sequence diagram illustrating an example component interaction according to various examples of the present disclosure.

Turning now to FIG. 2, shown is a sequence diagram 200 illustrating one example of interaction between the client application 124, the authentication application 128, the service provider 109, and the identity provider 106. Functionality attributed to the client application 124, the authentication application 128, the service provider 109, and the identity provider 106 can be implemented in a single process or application or in multiple processes or applications. The separation or segmentation of functionality as discussed herein is presented for illustrative purposes only.

Beginning with step 203, the client application 124 sends an access request to the service provider 109. At step 206, the service provider 109 sends a redirection back to the client application 124 that causes client application 124 to redirect the access request to the identity provider 106. At step 209, the client application 124 sends an identity assertion request to the identity provider 106. At step 212, the identity provider 106 detects the type of client application 124 and the platform and responds by requesting authentication by way of an SSO credential 125 for the specific platform. This can correspond to a certificate challenge or a Kerberos challenge. At step 215, the client application 124 obtains the SSO credential 125, e.g., by requesting the SSO credential 125 from the management application 121 or from the operating system. The process of obtaining the SSO credential 125 can involve obtaining credentials from the user (e.g., a password or a numeric code) to verify that the user should have access to the SSO credential 125. Obtaining these credentials would thus correspond to the initial single sign-on for the user.

At step 218, the client application 124 uses the SSO credential 125 to authenticate with the identity provider 106. At step 221, the MFA adapter 116 of the identity provider 106 determines that multi-factor authentication is required. At step 224, the MFA adapter 116 of the identity provider 106 requests one or more supplementary authentication factors from the authentication application 128. The input device for providing multi-factor authentication can be different from the client device 103 executing the client application 124. For example, a user can access a social networking application on a smartphone using single sign-on. When multi-factor authentication is enabled, the user can provide a supplementary authentication factor using a laptop or tablet. At step 227, the authentication application 128 obtains the supplementary authentication factors from a user through a user interface 127 or one or more input devices (e.g., fingerprint scanners, retinal scanners). At step 228, the authentication application 128 sends the supplementary authentication factors to the MFA adapter 116 of the identity provider 106.

At step 230, the MFA adapter 116 of the identity provider 106 verifies the MFA credentials supplied by the authentication application 128. The identity provider 106 returns the identity assertion to the client application 124 at step 233. The identity assertion can include an authentication token generated by the identity provider 106. At step 236, the client application 124 provides the identity assertion to the service provider 109. At step 239, the service provider 109 verifies the identity assertion. The service provider 109 generates a session token, such as an OAuth token, and returns the session token at step 242.

A single sign-on can thereby be implemented for subsequent client applications 124 or for the client application 124 seeking to authenticate with another service provider 109. Thus, the process can repeat again for the client applications 124a . . . 124N. Once the user is authenticated with the MFA adapter 116 for the purpose of authenticating client application 124a, the user need not enter security credentials again for authenticating client application 124b, unless perhaps due to inactivity or other events that could cause the identity of the user to be in question. That is to say, multi-factor authentication can be skipped based on a determination of the MFA adapter 116, and the validity of the SSO credential 125 can be relied upon. During the sign-on process, the user interface can remain stable to avoid "flipping" back and forth, making the process seamless to a user. In addition, multi-factor authentication can be required for some client applications 124 but not others, and different types of multi-factor authentication can be required for different client applications 124.

Figure 3:
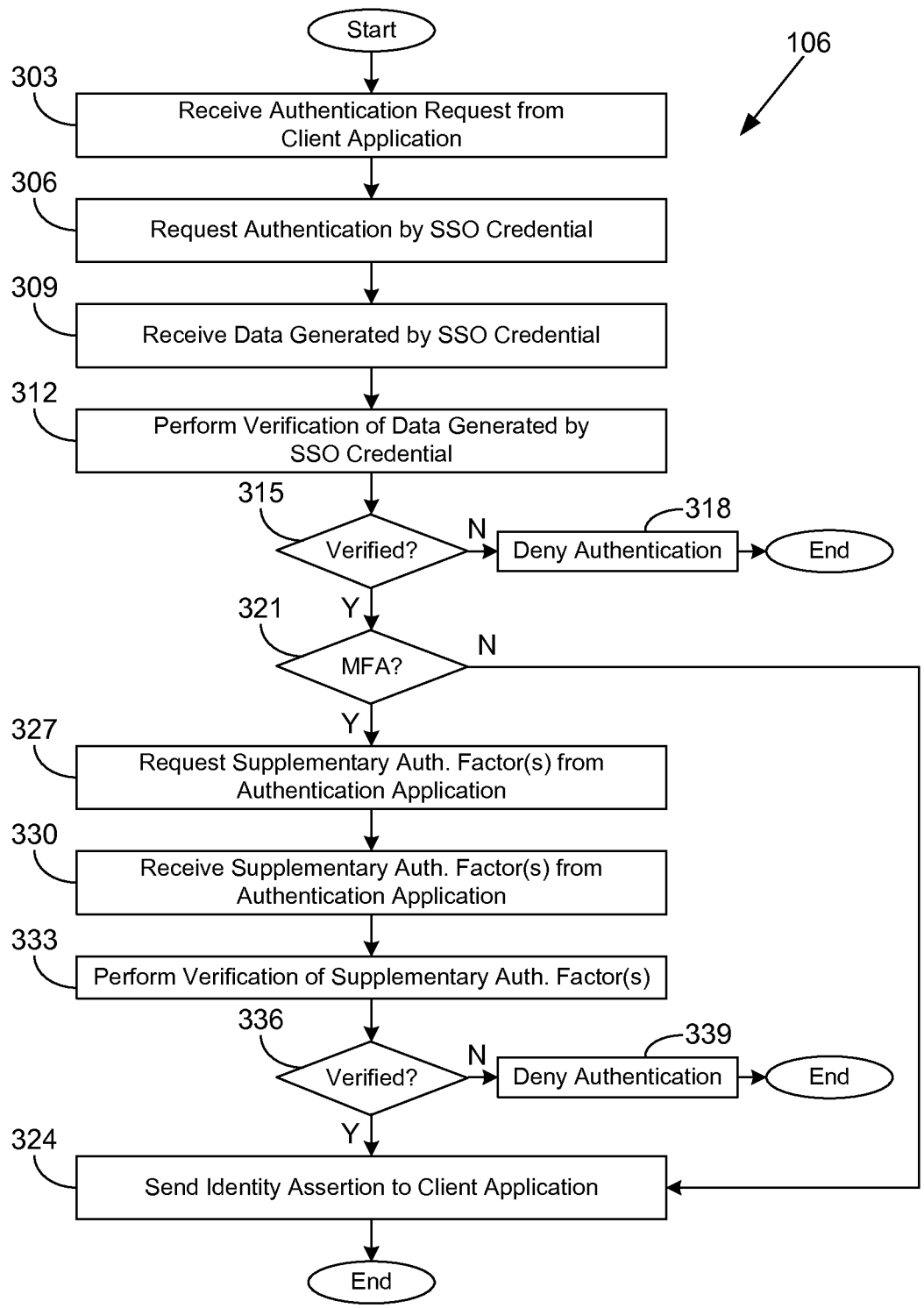
FIGS. 3-8 are flowcharts illustrating examples of functionality according to various examples of the present disclosure.

Moving on to FIG. 3, shown is a flowchart that provides one example of the operation of an identity provider 106. As an alternative, the flowchart of FIG. 3 can be viewed as depicting an example of elements of a method implemented in a computing device. Functionality attributed to the identity provider 106 can be implemented in a single process or application or in multiple processes or applications. The separation or segmentation of functionality as discussed herein is presented for illustrative purposes only.

Beginning with step 303, the identity provider 106 receives an authentication request such as an identity assertion request from a client application 124. The client application 124 has been redirected to the identity provider 106 by a service provider 109. The redirection can be performed, for example, by way of a hypertext transfer protocol (HTTP) redirection response. The identity provider 106 can determine a platform of the client device 103. The identity provider 106 can determine the platform by examining the user-agent string of the HTTP request. For example, the identity provider 106 can determine that the client device 103 corresponds to IOS, ANDROID, WINDOWS, BLACKBERRY, or other platforms based at least in part on corresponding identifiers contained in the user-agent string.

At step 306, the identity provider 106 requests authentication by the SSO credential 125. In some cases, this request can be based at least in part on the detected platform of the client device 103. Specifically, the identity provider 106 can request authentication using a platform-specific SSO credential 125 after querying a table of platforms based at least in part on information provided by the client device 103. Different types of security credentials and certificates can be used depending on the platform of the client device 103. For example, the SSO credential 125 can include a secure certificate, a Kerberos profile, or other credentials. Accordingly, to allow single sign-on from differing platforms, a platform adapter of the identity provider 106 can request the type of SSO credential 125 that is appropriate for the client device 103 that is requesting access. The SSO credential 125 can correspond to a management credential.

For example, when the platform is IOS, a platform adapter corresponding to an IOS-specific certificate adapter or Kerberos adapter can be used, such as an esso profile. When the platform is ANDROID, a platform adapter corresponding to a certificate adapter can be used. As additional examples, the OSX operating system can use a keychain, and WINDOWS 10 can use account provider credentials. The request for authentication can be performed by returning an HTTP response indicating that authorization is required. Further, the HTTP response can specifically request authentication by a particular protocol, such as the Kerberos protocol, through the use of a SSO credential 125.

At step 309, the identity provider 106 receives data associated with or generated by the SSO credential 125. In some cases, this data can be received in the initial authentication request. At step 312, the identity provider 106 performs a verification of the data associated with or generated by the SSO credential 125. The identity provider 106 can verify whether the SSO credential 125 is permitted to be used to authenticate specific client applications 124 or for specific service providers 109.

At step 315, the identity provider 106 determines whether the SSO credential 125 is verified. If the SSO credential 125 is not verified, the identity provider 106 denies the authentication at step 318 and an unauthorized message can be returned. Thereafter, the process proceeds to completion. If the SSO credential 125 is verified, the identity provider 106 continues to step 321.

At step 321, the identity provider 106 determines whether multi-factor authentication (MFA) is to be used. The MFA rules 117 can specify a variety of situations and factors in which MFA is to be used or is not to be used. For example, MFA can be required for authentication of specific client applications 124. MFA can be required for specific versions of a particular client application 124 or for specific operating system versions. In this regard, the MFA adapter 116 can determine the identity of the particular client application 124, the specific version of the client application 124, and/or the version of the operating system, which can be specified in the authentication request. Some client applications 124, particular versions of client applications 124, and/or particular operating system versions can be regarded as insecure or vulnerable to compromise, which can dictate a greater level of security and hence the use of MFA.

In another example, the MFA adapter 116 can determine the location of the client device 103 on which the client application 124 is executed. The location can be determined through reporting of global positioning system (GPS) coordinates, triangulation based on wireless access points and/or cell base stations, geolocation of an internet protocol address, or other approaches. A risk score can be computed based at least in part on the location and/or on other factors. For example, if the client device 103 has moved from one country to another, or has moved to a country associated with a heightened risk level, the risk score can be relatively high (e.g., exceeding a threshold), and at least on this basis, the MFA adapter 116 can determine that additional supplementary authentication factors are required. Other factors that can weigh towards a risk profile that would require MFA can include, a level of network traffic (e.g., high levels of network traffic can be associated with system compromises), a quantity of applications installed on the client device 103 (e.g., an increased number of applications can point to a device compromise), and others.

It is noted that whether MFA is required can change over time. Thus, for one authentication request from a client application 124 on a particular client device 103, MFA is not required, while for a subsequent authentication request from the same client application 124 on the particular client device 103, MFA can be required due to a change in a risk profile taking into account various factors (e.g., operating system version, application version, application identity, location, and so on).

If multi-factor authentication is not required, the identity provider 106 moves to step 324, where an identity assertion is generated and sent to the client application 124. The identity assertion can include security assertion markup language (SAML), extensible access control markup language (XACML), or other data. For example, the identity assertion can include an authentication token that is generated by the identity provider 106. Thereafter, the process proceeds to completion.

However, if multi-factor authentication is to be used, the MFA adapter 116 requests one or more supplementary authentication factors from an authentication application 128 at step 327. The MFA adapter 116 can request any of a variety of supplemental authentication factors, such as onetime passwords, smartcards, biometric identifiers, and so on. It is noted that the client application 124 does not natively support one or more of the supplemental authentication factors in various scenarios. The authentication application 128 can be executed on the same client device 103 or on a different client device 103 as compared to the client application 124. When executed on a different client device 103, any response from the authentication application 128 (e.g., a simple authentication approval) can be regarded as a proof of possession factor for the different client device 103. In some situations, the client device 103 on which the authentication application 128 is executed is an unmanaged client device, while the client device 103 on which the client application 124 is executed is a managed client device.

At step 330, the MFA adapter 116 receives the requested supplementary authentication factors from the authentication application 128. At step 333, the MFA adapter 116 performs a verification of the supplementary authentication factors. At step 336, the MFA adapter 116 determines whether the supplementary authentication factors are verified. If the supplementary authentication factors are not verified, the identity provider 106 denies the authentication at step 339 and an unauthorized message can be returned. Thereafter, the process proceeds to completion.

If the supplementary authentication factors are verified, the identity provider 106 continues to step 324. At step 324, an identity assertion is generated and sent to the client application 124. Thereafter, the process proceeds to completion.

Figure 4:
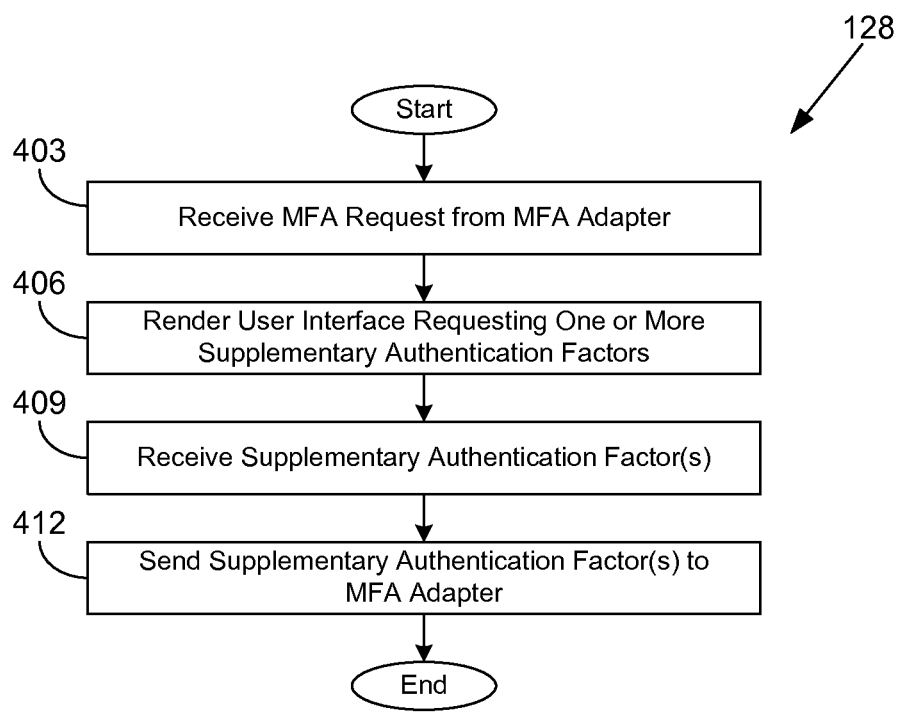

Turning now to FIG. 4, shown is a flowchart that provides one example of the operation of an authentication application 128. Functionality attributed to the authentication application 128 can be implemented in a single process or application or in multiple processes or applications. The separation or segmentation of functionality as discussed herein is presented for illustrative purposes only.

Beginning with step 403, the authentication application 128 receives a multi-factor authentication (MFA) request from the MFA adapter 116 of the identity provider 106. The MFA request can specify a set of supplementary authentication factors that are to be requested of the user in order for a concurrent authentication of another client application 124 to proceed. The client application 124 that is requesting authentication can be executed in the same client device 103 as the authentication application 128 or in a different client device 103. The MFA request can specify that certain authentication factors are optional or required. In some cases, a certain number of authentication factors are required. As an example, a user can choose to provide a voice sample or a fingerprint scan, or to answer four of ten knowledge-based questions.

At step 406, the authentication application 128 renders a user interface 127 that requests the supplementary authentication factors of the user. For example, the authentication application 128 can request the user to provide a fingerprint scan, a retina scan, a voice sample, or other biometric identifiers. In other examples, the user can be requested to answer knowledge-based questions, enter a numerical code, use a smartcard, provide one-time passwords from a software or hardware token, or respond to other challenges. In still another example, the user can simply be asked to approve or deny the request, and upon approval, the authentication application 128 communicates the approval to the MFA adapter 116. In this regard, the authentication application 128 can prove its identity using stored registration credentials or using a token communicated to the authentication application 128 by way of a predefined communication channel, e.g., an email address, a telephone number, etc.

At step 409, the authentication application 128 receives the supplementary authentication factors. At step 412, the authentication application 128 sends the received supplementary authentication factors to the MFA adapter 116 of the identity provider 106. The MFA adapter 116 is subsequently able to verify the authentication factors and allow the concurrent authentication of the client application 124 to complete. Thereafter, the process proceeds to completion.

Figure 5:
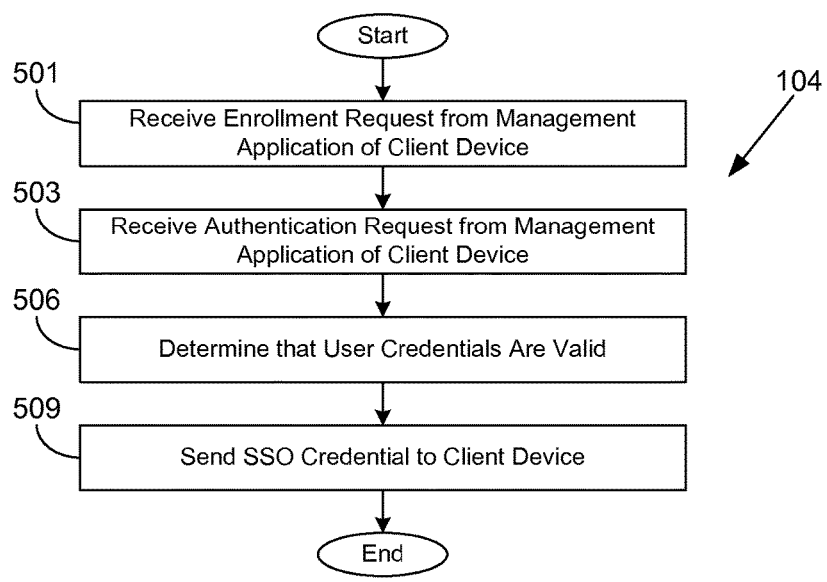

Continuing on to FIG. 5, shown is a flowchart that provides one example of the operation of a device management service 104. Functionality attributed to the device management service 104 can be implemented in a single process or application or in multiple processes or applications. The separation or segmentation of functionality as discussed herein is presented for illustrative purposes only.

Beginning with step 501, the device management service 104 receives an enrollment request from a client device 103. For example, a user can navigate to a certain uniform resource locator (URL) in a browser, the management application 121 can be installed on the client device 103, and a user can accept the terms of the enrollment. Then, a platform-specific management certificate can be sent to the management application 121. The platform-specific management certificate can be received within a profile which the client device 103 installs in a profile store as the management profile.

In step 503, the device management service 104 receives an authentication request from the management application 121 of the client device 103. The request can specify one or more security credentials, such as usernames, passwords, biometric identification, one-time passwords, and so on. At step 506, the device management service 104 determines that the security credentials that have been presented are valid. If the security credentials are not valid, an error can be generated.

At step 509, the device management service 104 sends one or more SSO credentials 125 to the client device 103. The SSO credentials 125 can be generated by a certificate authority corresponding to the device management service 104. In one use case, SSO credentials 125 can be employed to create a secure communications channel between the device management service 104 and the management application 121 for device management purposes. In another use case, the SSO credentials 125 can be used to facilitate authentication with an identity provider 106. Thereafter, the process proceeds to completion.

Figure 6:
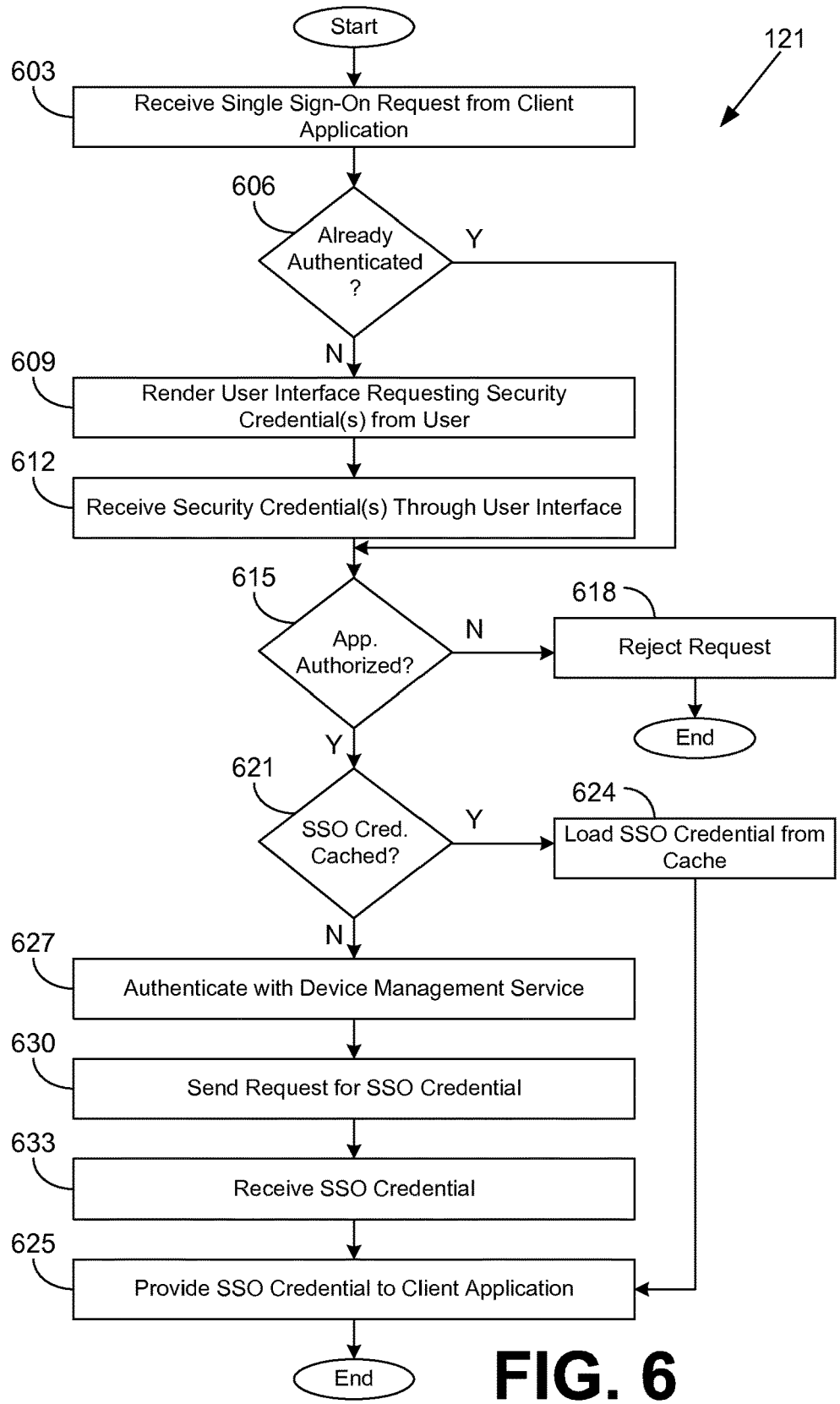

With reference to FIG. 6, shown is a flowchart that provides one example of the operation of a management application 121. Functionality attributed to the management application 121 can be implemented in a single process or application or in multiple processes or applications. The separation or segmentation of functionality as discussed herein is presented for illustrative purposes only.

Beginning with step 603, the management application 121 receives a single sign-on request from a client application 124. For example, the client application 124 can be prompted to use a SSO credential 125 in order to authenticate with an identity provider 106. At step 606, the management application 121 determines whether the user is already authenticated. If the user is not already authenticated, the management application 121 moves to step 609 and renders a user interface 127 on the display 118 that requests one or more security credentials from the user. At step 612, the management application 121 receives the security credentials through the user interface 127. The management application 121 continues to step 615. If the user is already authenticated by the management application 121, the management application 121 moves directly from step 606 to step 615.

At step 615, the management application 121 determines whether the client application 124 is authorized to receive the SSO credential 125. The management application 121 can make this determination with respect to the access rules 126 or by way of communication with the device management service 104. Examples of access rules 126 include detecting whether a device is jailbroken, uses a password of a given length or complexity, is used within a certain geographic area, has certain applications installed, has certain hardware devices (e.g., a fingerprint reader), and/or other meets other criteria relevant to the organization for whom the client device 103 is managed. If the client application 124 is not authorized, the management application 121 moves to step 618 and rejects the request. Thereafter, the process proceeds to completion.

If the client application 124 is authorized, the management application 121 moves to step 621 and determines whether the SSO credential 125 has been cached in the client device 103. If the SSO credential 125 has been cached, the management application 121 loads the SSO credential 125 from the cache at step 624. At step 625, the management application 121 provides the SSO credential 125 to the client application 124. Thereafter, the process proceeds to completion.

If the SSO credential 125 has not been cached, the management application 121 moves from step 621 to step 627 and authenticates with the device management service 104. To this end, the management application 121 can authenticate using the user-supplied credentials or a session or registration token. At step 630, the management application 121 sends a request for the SSO credential 125 to the device management service 104. At step 633, the management application 121 receives the SSO credential 125 from the device management service 104. At step 625, the management application 121 provides the SSO credential 125 to the client application 124. Thereafter, the process proceeds to completion.

Figure 7:
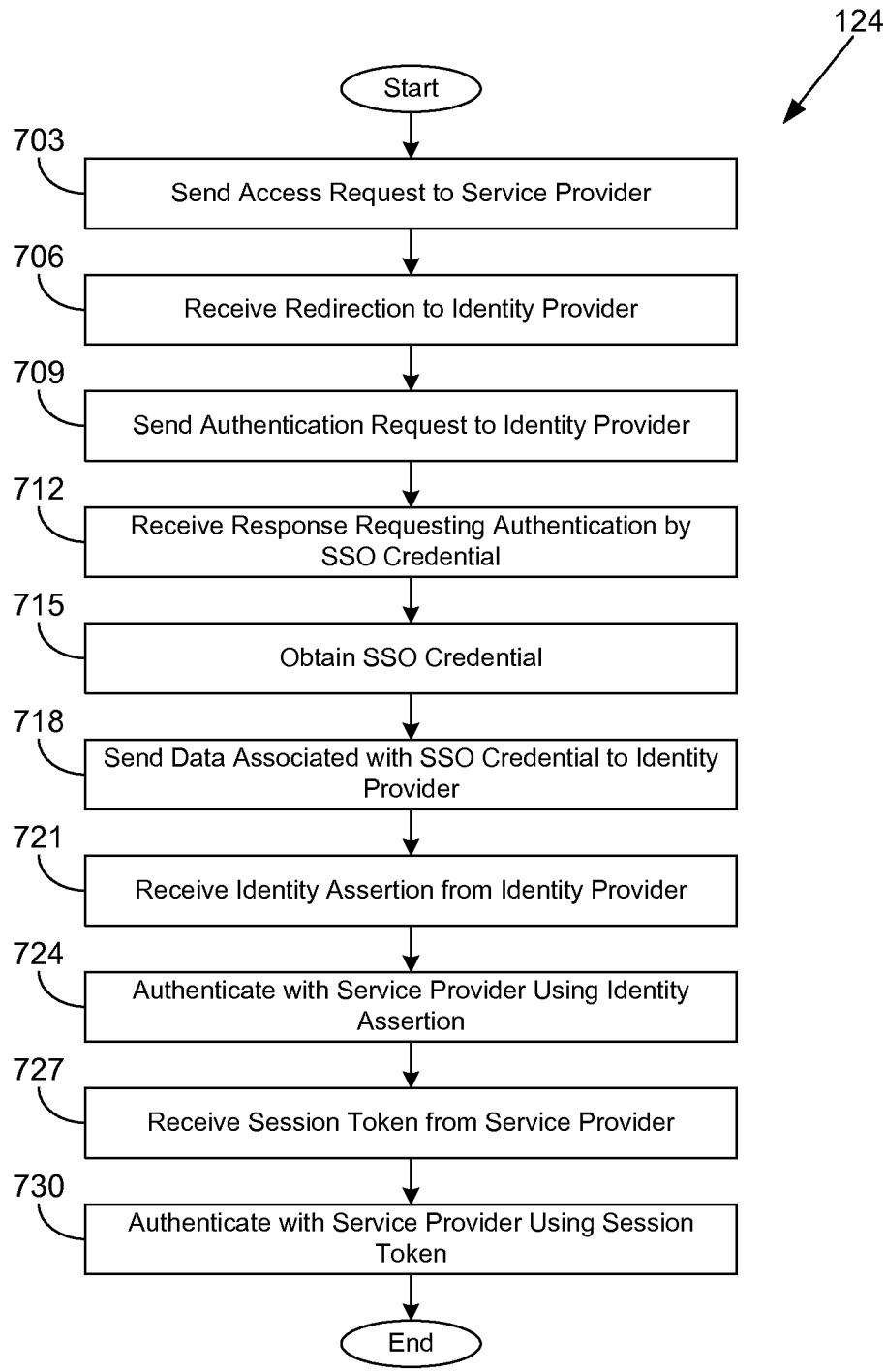

Turning now to FIG. 7, shown is a flowchart that provides one example of the operation of a client application 124. Functionality attributed to the client application 124 can be implemented in a single process or application or in multiple processes or applications. The separation or segmentation of functionality as discussed herein is presented for illustrative purposes only.

Beginning with step 703, the client application 124 sends an access request to a service provider 109. At step 706, the client application 124 receives a redirection to the identity provider 106. The redirection can include a hypertext transfer protocol (HTTP) redirection response. At step 709, the client application 124 sends an authentication request to the identity provider 106. At step 712, the client application 124 receives a response requesting authentication by a SSO credential 125.

At step 715, the client application 124 obtains the SSO credential 125 from the management application 121. To this end, the client application 124 can send a request by a local uniform resource locator (URL) to the management application 121 and can also receive a response from the management application 121 by a local URL. The local URL used to invoke the management application 121 can include callback information such as a scheme name corresponding to the client application 124 so that the management application 121 can identify the client application 124 and return the requested SSO credential 125.

At step 718, the client application 124 sends data associated with or generated by the SSO credential 125 to the identity provider 106 as part of the authentication request. Subsequently, the MFA adapter 116 of the identity provider 106 can request additional supplementary authentication factors by way of an authentication application 128, but the client application 124 need not be aware of this process. At step 721, assuming that if multi-factor authentication was required, the MFA adapter 116 determines that the multi-factor authentication was successful, then the client application 124 receives an identity assertion from the identity provider 106. The identity assertion can include an authentication token generated by the identity provider 106. The identity assertion can correspond to a security assertion markup language (SAML) assertion or another assertion.

At step 724, the client application 124 authenticates with the service provider 109 using the identity assertion. At step 727, the client application 124 receives a session token from the service provider 109. For example, the session token can correspond to an OAuth token. Subsequently, at step 730, the client application 124 can authenticate with the service provider 109 to access resources. Thereafter, the process proceeds to completion.

Figure 8:
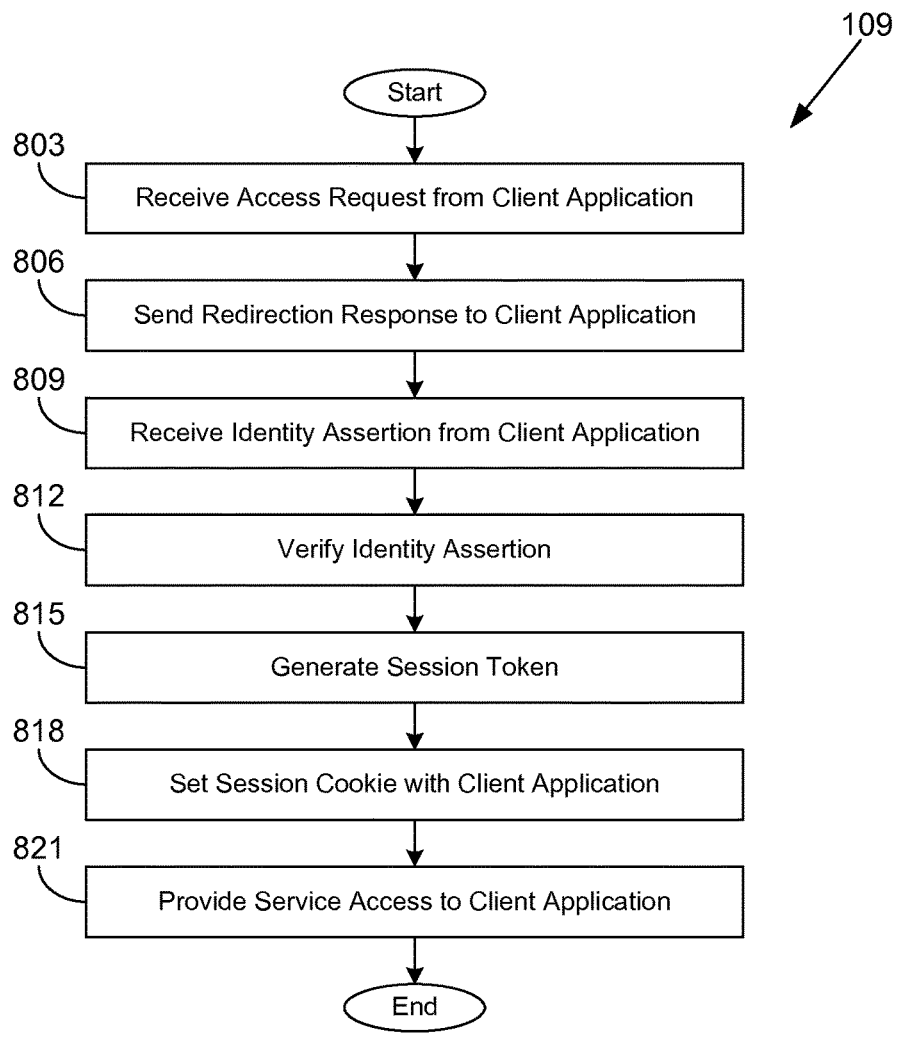

Referring next to FIG. 8, shown is a flowchart that provides one example of the operation of a service provider 109. As an alternative, the flowchart of FIG. 8 can be viewed as depicting an example of elements of a method implemented in a computing device. Functionality attributed to the service provider 109 can be implemented in a single process or application or in multiple processes or applications. The separation or segmentation of functionality as discussed herein is presented for illustrative purposes only.

Beginning with step 803, the service provider 109 receives an access request from a client application 124. The service provider 109 then correlates this access request to the use of the identity provider 106 for authentication. At step 806, the service provider 109 sends a redirection response to the client application 124. This can include a hypertext transfer protocol (HTTP) redirection response. The redirection response can redirect the client application 124 to the identity provider 106. The redirection response can include security assertion markup language (SAML) that requests an identity assertion.

At step 809, the service provider 109 receives the identity assertion from the client application 124. At step 812, the service provider 109 verifies the identity assertion. For example, the identity assertion can include an authentication token generated by the identity provider 106, and the service provider 109 can confirm that the authentication token is authentic.

At step 815, the service provider 109 generates a session token. At step 818, the service provider 109 sets a session cookie including the session token with the client application 124. At step 821, the service provider 109 provides service access to the client application 124 based at least in part on the client application 124 presenting the session token, by way of a uniform resource locator (URL) or session cookie. Thereafter, the process can proceed to completion.

The flowcharts of FIGS. 3-8 and the sequence diagram of FIG. 2 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the device management service 104, the identity provider 106, the service providers 109, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the identity provider 106, the device management service 104, the service providers 109, the management application 121, the client applications 124, the authentication application 128, and/or other components can be stored in one or more storage devices and be executable by one or more processors. Also, a data store, such as the identity data store 115 or the management data store 113 can be stored in the one or more storage devices.

The identity provider 106, the service providers 109, the management application 121, the client applications 124, the device management service 104, the authentication application 128, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device, the program, when executed by the at least one computing device, being configured to cause the at least one computing device to at least:
    receive an authentication request for a first client application executed in a client device;
    receive data generated by a single sign-on credential from the client device as part of a single sign-on process, the single sign-on credential being configured to be used by a plurality of client applications of the client device;
    verify the data generated by the single sign-on credential;
    determine whether at least one supplementary authentication factor is required from a second client application by:
        determining a version of an operating system of the client device; and
        determining that the at least one second authentication factor should be requested when the version of the operating system corresponds to a particular operating system version;
    when the at least one supplementary authentication factor is required, and prior to sending an authentication token to the first client application:
        request the at least one supplementary authentication factor from the second client application;
        receive the at least one supplementary authentication factor from the second client application; and
        verify the at least one supplementary authentication factor prior to allowing the first client application to be authenticated in the single sign-on process;
    in response to verifying the data generated by the single sign-on credential and verifying the at least one supplementary authentication factor from the second client application, generate the authentication token; and
    send the authentication token to the first client application.

2. The non-transitory computer-readable medium of claim 1, wherein the single sign-on credential comprises at least one of: a secure certificate or a Kerberos profile.

3. The non-transitory computer-readable medium of claim 1, wherein the second client application is executed in the client device.

4. The non-transitory computer-readable medium of claim 1, wherein the second client application is executed in a different client device.

5. The non-transitory computer-readable medium of claim 1, wherein the first client application does not natively support authentication using the at least one supplemental authentication factor.

6. The non-transitory computer-readable medium of claim 1, wherein the at least one supplementary authentication factor comprises at least one of: a one-time password, a smartcard, or a biometric identifier.

7. The non-transitory computer-readable medium of claim 1, wherein the program, when executed by the at least one computing device, is further configured to cause the at least one computing device to:
    send a response to the authentication request to the first client application, the response requesting authentication by the single sign-on credential, wherein the authentication request is redirected from a service provider for which authentication is desired.

8. A system, comprising:
    at least one computing device; and
    an identity provider service executable by the at least one computing device, the identity provider service configured to cause the at least one computing device to at least:
        receive an authentication request for a first client application executed in a client device;

receive data generated by a single sign-on credential from the client device as part of a single sign-on process, the single sign-on credential being configured to be used by a plurality of client applications of the client device;

verify the data generated by the single sign-on credential;

determine whether at least one supplementary authentication factor is required from a second client application by:
  determining a version of an operating system of the client device; and
  determining that the at least one second authentication factor should be requested when the version of the operating system corresponds to a particular operating system version;

when the at least one supplementary authentication factor is required, and prior to sending an authentication token to the first client application;
  request the at least one supplementary authentication factor from the second client application;
  receive the at least one supplementary authentication factor from the second client application; and
  verify the at least one supplementary authentication factor prior to allowing the first client application to be authenticated in the single sign-on process;

in response to verifying the data generated by the single sign-on credential and verifying the at least one supplementary authentication factor from the second client application, generate the authentication token; and send the authentication token to the first client application.

9. The system of claim 8, wherein the single sign-on credential comprises data generated by at least one of: a secure certificate or a Kerberos profile.

10. The system of claim 8, wherein the authentication token is sent within a security assertion markup language (SAML) identity assertion.

11. The system of claim 8, wherein the first client application does not natively support authentication using the at least one supplemental authentication factor.

12. The system of claim 8, wherein the at least one supplementary authentication factor comprises at least one of: a one-time password, a smartcard, or a biometric identifier.

13. A method, comprising:
receiving an authentication request for a first client application executed in a client device;
receiving data generated by a single sign-on credential from the client device as part of a single sign-on process, the single sign-on credential being configured to be used by a plurality of client applications of the client device;
verifying the data generated by the single sign-on credential;
determining whether at least one supplementary authentication factor is required from a second client application by:
  determining a version of an operating system of the client device; and
  determining that the at least one second authentication factor should be requested when the version of the operating system corresponds to a particular operating system version;
when the at least one supplementary authentication factor is required, and prior to sending an authentication token to the first client application:
  requesting the at least one supplementary authentication factor from the second client application;
  receiving the at least one supplementary authentication factor from the second client application; and
  verifying the at least one supplementary authentication factor prior to allowing the first client application to be authenticated in the single sign-on process;
in response to verifying the data generated by the single sign-on credential and verifying the at least one supplementary authentication factor from the second client application, generating the authentication token; and
sending the authentication token to the first client application.

14. The method of claim 13, wherein the single sign-on credential comprises at least one of: a secure certificate or a Kerberos profile.

15. The method of claim 14, wherein the first client application is configured to request a session token from a service provider using the authentication token.

16. The method of claim 13, wherein the first client application does not natively support authentication using the at least one supplemental authentication factor.

17. The method of claim 13, wherein the at least one supplementary authentication factor comprises at least one of: a one-time password, a smartcard, or a biometric identifier.

18. The method of claim 13, further comprising:
sending a response to the authentication request to the first client application, the response requesting authentication by the single sign-on credential, wherein the authentication request is redirected from a service provider for which authentication is desired.

19. The method of claim 13, wherein the at least one supplemental authentication factor is requested in response to the data generated by the single sign-on credential being verified.

20. The method of claim 13, further comprising determining that the at least one supplemental authentication factor is necessary based at least in part on the first client application.

* * * * *